United States Patent [19]
Reynolds et al.

[11] Patent Number: 5,626,314
[45] Date of Patent: May 6, 1997

[54] PASSIVE INTERMODULATION SHIELD

[75] Inventors: Robert L. Reynolds, Los Angeles; Jodi L. Larson, Yorba Linda; Judy V. May, Los Angeles, all of Calif.

[73] Assignee: Hughes Aircraft Co., Los Angeles, Calif.

[21] Appl. No.: 565,567

[22] Filed: Nov. 30, 1995

Related U.S. Application Data

[63] Continuation-in-part of Ser. No. 784,338, Oct. 29, 1991.

[51] Int. Cl.$^6$ ............................................. B64G 1/58
[52] U.S. Cl. ................. 244/158 A; 244/121; 244/1 A; 136/292
[58] Field of Search ................. 244/158 A, 121, 244/1 A, 158 R, 163; 136/292, 244; 250/492.1, 492.2, 492.21, 492.3; 428/457, 458, 323, 328, 473, 444.4

[56] References Cited

U.S. PATENT DOCUMENTS

| | | | |
|---|---|---|---|
| 4,451,828 | 5/1984 | Fuldner | 343/872 |
| 4,489,906 | 12/1984 | Fellas | 244/158 A |
| 4,755,231 | 7/1988 | Kurland et al. | 136/244 |
| 4,910,050 | 3/1990 | Oldham et al. | 427/386 |
| 4,925,134 | 5/1990 | Keller et al. | 244/158 A |
| 4,996,109 | 2/1991 | Krieg et al. | 428/304.4 |

FOREIGN PATENT DOCUMENTS

| | | |
|---|---|---|
| 0356714 | 7/1989 | European Pat. Off. . |
| 2469388 | 11/1980 | France . |

OTHER PUBLICATIONS

Reeve, Ronald T.; Jet Propulsion Laboratory, California Institute of Technology, "*Thermal Redesign of the Galileo Spacecraft for a VEEGA Trajectory,*" Journal of Spacecraft and Rockets (Mar./Apr., 1991).

Stultz, James W.; Jet Propulsion Laboratory, California Institute of Technology; "*Thermal Design of the Galileo Spun and Despun Science,*" Journal of Spacecraft and Rockets (Mar./Apr. 1991).

Tsunoda, H., et al.; NTT Radio Communication Systems Laboratories, "*Thermal Design Verification of a Large Depolyable Antenna for a Communications Satellite,*" Journal of Spacecraft and Rockets (Mar./Apr. 1992).

*Primary Examiner*—Christopher P. Ellis
*Attorney, Agent, or Firm*—Elizabeth E. Leitereg; Terje Gudmestad; Wanda K. Denson-Low

[57] ABSTRACT

A passive intermodulation shield (10) for a spacecraft is made from a substrate (12) and a vacuum deposited aluminum layer (14) over the substrate (12). The substrate (12) can include a polyimide sheet such as Kapton. The vacuum deposited aluminum layer (14) has a thickness (16) to produce a surface resistivity which maintains both the inherent passive intermodulation generation and the passive intermodulation passthrough below a predetermined value. Preferably, the surface resistivity is selected between 10 ohms per square and 40 ohms per square. Spacecraft multilayer insulation blankets (30, 40, 50, 60) are formed by disposing the passive intermodulation shield (10) between a pair of outer layers.

20 Claims, 2 Drawing Sheets

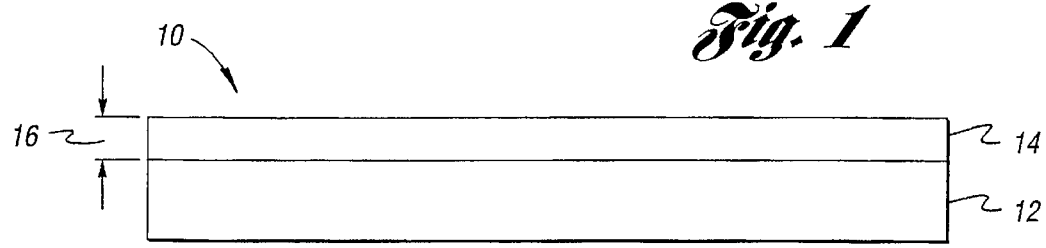
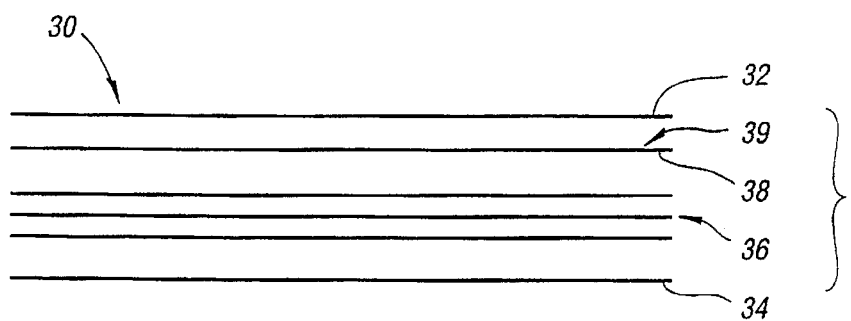
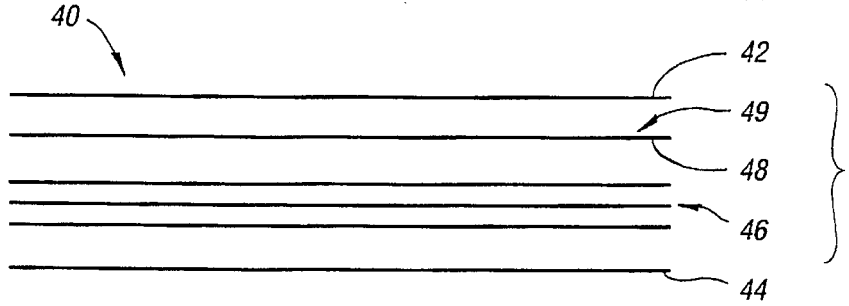
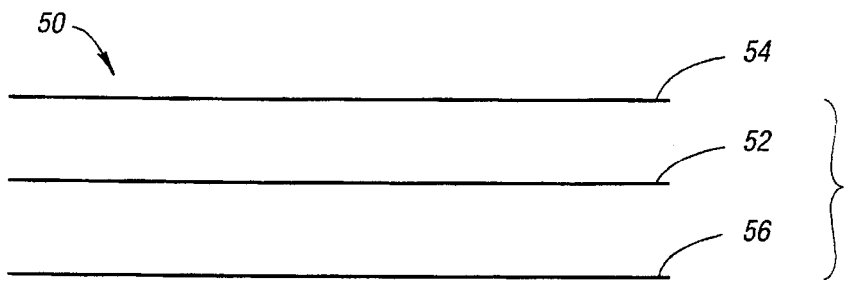
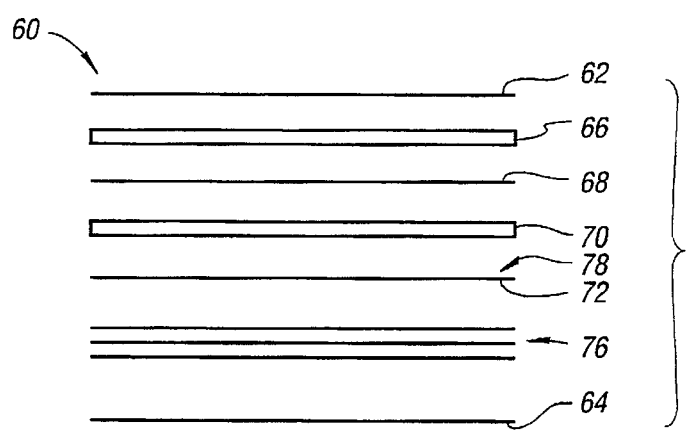

PASSIVE INTERMODULATION SHIELD

CROSS-REFERENCE TO RELATED APPLICATION

The present application is a continuation-in-part of copending U.S. application "Spacecraft Protective Blanket", having Ser. No. 07/784,338 filed on Oct. 29, 1991, and having the same assignee as the present application. The subject matter of the above-identified application is hereby incorporated by reference into the disclosure of the present application.

TECHNICAL FIELD

The present invention relates to shields for protecting a spacecraft from a spacecraft environment and shields for protecting a spacecraft from passive intermodulation generation.

BACKGROUND ART

Communication satellites and other spacecraft typically employ a protective blanket to shield electrical and other componentry from an environment through which the spacecraft travels. This environment includes high and low temperature extremes, solar radiation, electron bombardment, and radio frequency interference from a variety of sources.

A conventional protective blanket, such as one described in U.S. Pat. No. 4,489,906 to Fellas, is constructed from a polyimide sheet upon which a coating of aluminum is deposited. The blanket is fastened to the spacecraft using rivets and/or adhesives. Although the blanket acts to reflect radiation, the blanket also acts to generate passive intermodulation (PIM) distortion.

Passive intermodulation distortion can be generated due to microdischarges by small cracks or voids in the aluminum coating. Also, the existence of metal-insulator-metal junctions that are exposed to carrier power can result in a non-linear behavior that can, in turn, result in passive intermodulation. Further, short circuits through the aluminum coating, and contact of the aluminum coating with connecting rivets and other parts of the spacecraft can act to generate passive intermodulation.

Currently-available flight-approved materials for protective blankets and shields fall into two categories. A first category includes conductive foils and thin film materials with a surface resistance less than 1.5 ohms per square. The first category of materials disadvantageously acts as a potential source of PIM. A second category of materials includes carbon-filled and thin film materials with surface resistance greater than 200 ohms per square. The second category of materials disadvantageously fails to adequately shield many sources of PIM.

These materials have been combined to achieve low PIM in thermal blankets and PIM shields. However, the combination of the materials has been disadvantageous in at least one of: (i) adding weight to the blanket or shield; (ii) increasing the material cost and/or labor cost to produce the blanket or shield; (iii) adding bulkiness and stiffness to the blanket or shield; (iv) resulting in a blanket or shield with poor thermal properties; and (v) providing only a marginal reduction in PIM.

SUMMARY OF THE INVENTION

It is an object of the present invention to provide an effective passive intermodulation shield to sufficiently cover external sources of passive intermodulation without inherently generating a substantial passive intermodulation potential.

A further object is to provide a protective shield which limits inherent PIM generation, shields external PIM, is light-weight, economical, easily conformable to a structure, and has improved thermal properties.

In carrying out the above objects, the present invention provides a passive intermodulation shield comprising a substrate and a conducting layer deposited over the substrate. The conducting layer, which is an aluminum layer in one embodiment, produces a surface resistivity within a predetermined range to simultaneously limit an amount of inherent passive intermodulation generation of the shield and to provide suitable passive intermodulation shielding. As an alternative to aluminum, the conducting layer can also be a layer of nickel, nickel chrome, carbon, or one of many other thin metal resistive films.

In one embodiment, the substrate includes a polyimide sheet such as a Kapton sheet. Alternatively, the substrate can be formed of mylar or one of many other dielectric substrates. The surface resistivity produced by the aluminum layer on the substrate is selected to be greater than 2 ohms per square to limit an amount of inherent passive intermodulation generation, and less than 200 ohms per square to provide suitable passive intermodulation shielding.

In an exemplary embodiment, the surface resistivity is between 10 ohms per square and 40 ohms per square to provide a near-optimum of a multicriterion objective for simultaneously limiting the amount of inherent passive intermodulation generation and providing passive intermodulation shielding.

Further in carrying out the above objects, the present invention provides a blanket for protecting a spacecraft from a space environment. The blanket includes a pair of outer layers and a passive intermodulation shield, as described above, disposed between the pair of outer layers.

These and other feature, aspects, and embodiments of the present invention will become better understood with regard to the following description, appended claims, and accompanying drawings.

BRIEF DESCRIPTION OF THE DRAWINGS

FIG. 1 shows a cross-sectional view of an embodiment of a passive intermodulation shield in accordance with the present invention;

FIG. 3 shows a schematic, cross-sectional view of an embodiment of a PIM isolator blanket in accordance with the present invention;

FIG. 4 shows a schematic, cross-sectional view of an embodiment of a radio frequency interference shielding blanket in accordance with the present invention;

FIG. 5 shows a schematic, cross-sectional view of an embodiment of a PIM suppressive blanket in accordance with the present invention; and FIG. 6 shows a schematic, cross-sectional view of an embodiment of a radio frequency reflection-suppression blanket in accordance with the present invention.

BEST MODE FOR CARRYING OUT THE INVENTION

Figure 2:
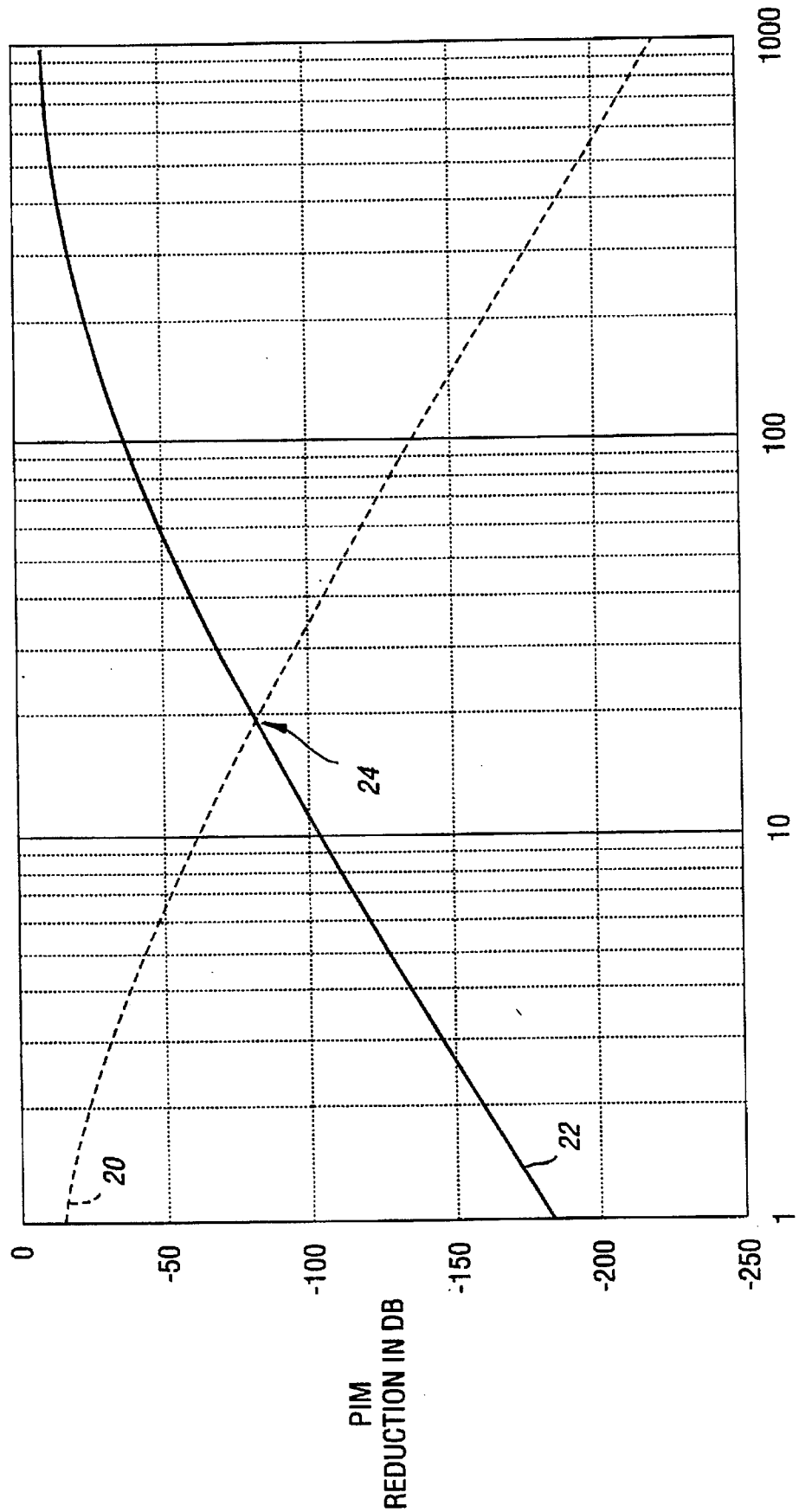
FIG. 2 shows a graph of an estimated amount of inherent passive intermodulation generation and a graph of an estimated amount of passive intermodulation shielding provided by the shield as a function of the surface resistivity R.

Turning now to FIG. 1, there is shown a cross-sectional view of an embodiment of a passive intermodulation shield 10 in accordance with the present invention. The passive intermodulation shield 10 includes a substrate 12 and an aluminum layer 14 deposited over the substrate 12. The substrate 12 can be embodied by a dielectric material such as a polyimide sheet. Such a polyimide sheet is available from the DuPont Corporation under the trademark "Kapton". In a preferred embodiment, the Kapton substrate has a thickness of between 0.00025 inches and 0.003 inches.

The aluminum layer 14 can be in the form of a thin layer of vacuum deposited aluminum (VDA) over the substrate 12. The aluminum layer 14 has a thickness 16 which can be called out in terms of a resulting surface resistivity. The surface resistivity can be measured in units of "ohms per square", for example.

It is known that a vacuum deposited aluminum layer over a substrate of Kapton produces a PIM-generating source, and further, one of the most significant PIM-generating sources on a spacecraft. For the purpose of this application, PIM caused by the composition of a material itself (as opposed to contact with other materials) is referred to as inherent passive intermodulation.

FIG. 2 shows a graph of an estimated amount of inherent passive intermodulation generation 20 and a graph of an estimated amount of passive intermodulation shielding 22 provided by the shield 10 as a function of the surface resistivity R. The inherent PIM generation graph 20 illustrates an amount of PIM potentially created by the resistive shield compared to solid metals. The PIM shielding graph 22 illustrates an amount of PIM reduction achieved by covering a PIM source with a resistive shield. The graphs are calculated using free space attenuation curves of resistive materials plus a measured attenuation factor known for sources of PIM.

It can be seen that the amount of inherent PIM generated by the shield is decreased by increasing the surface resistivity R. However, the PIM shielding capability of the shield, i.e. the amount of external PIM which passes through the shield, is improved by decreasing the surface resistivity R. As a result, highly conductive materials shield well, but create another potentially powerful PIM source in the process, namely, the shield material. Further, highly resistive materials do not create a high PIM potential in themselves, but fail to adequately shield high sources of PIM.

It is desirable to shield an existing strong source of PIM from transmit energy without creating another potentially strong source of PIM in the process. In order to select a desirable value of the surface resistivity R (and hence the thickness 16 of the aluminum layer 14), a multicriterion objective for simultaneously limiting both the amount of inherent passive intermodulation generation and the amount of external passive intermodulation which passes through the shield is formulated. One such multicriterion objective is to maintain both the inherent PIM generation and the external PIM passthrough below a predetermined value.

By selecting the thickness 16 of the aluminum layer 14 so that the surface resistivity is between approximately 2 ohms per square and 200 ohms per square, the maximum of the inherent PIM generation and the external PIM passthrough is maintained to be no greater than approximately −20 dB. Keeping the surface resistivity between approximately 4 ohms per square and 100 ohms per square limits the maximum of the inherent PIM generation and the external PIM passthrough to be no greater than approximately −35 dB. It is preferred that the surface resistivity be within the range of approximately 10 ohms per square and 40 ohms per square so that the maximum of the inherent PIM generation and the external PIM passthrough is less than approximately −55 dB.

Selecting the surface resistivity to be approximately 20 ohms per square is near-optimal in minimizing the maximum of the inherent PIM generation and the external PIM passthrough of the shield. This occurs at a point 24 where the graph of inherent PIM generation 20 intersects the graph of external PIM passthrough 22. At the point 24, both the inherent PIM generation and the external PIM passthrough are approximately −80 dB.

Existing carbon Kapton materials are capable of being manufactured in the range between 100 ohms per square and 10000 ohms per square. Materials in this range are useful in PIM-sensitive locations of very high transmit flux densities as they offer the benefit of very low inherent PIM generation while maintaining a capacity to shield existing sources of PIM. Thin metal films can be manufactured in the range between 1 ohm per square and 100 ohms per square. Materials in this range are useful in locations where a high degree of shielding is required and some inherent PIM generation is tolerable.

Table I shows a summary of test data for a PIM shield in accordance with the present invention. The PIM shield is formed of a single-sided 2 mil Kapton-VDA material having a surface resistivity of approximately 22 ohms per square. As can be seen in Table I, an L-band PIM test was performed with the PIM shield. The inherent PIM generated by the PIM shield is less than −80 dB and the PIM shielding is −75 dB. The inherent/contact PIM characteristics are significantly reduced. Hence, the PIM shield is amenable for PIM-sensitive applications.

TABLE I

| RF PARAMETERS | FREE SPACE | | WAVEGUIDE | |
|---|---|---|---|---|
| INSERTION LOSS | −19.7 DB | 1% | −20.4 DB | .9% |
| RETURN LOSS | −.69 DB | 85% | −.85 DB | 82% |
| ABSORPTION | | 13.9% | | 17/1% |

| | L-BAND 7TH ORDER REDUCTION OVER STANDARD VDA | | |
|---|---|---|---|
| PIM TEST: | INHERENT PIM | CONTACT PIM | PIM SHIELDING |
| | <−80 DB | −77 DB | −75 DB |

| THERMAL RADIATIVE PROPERTIES | | |
|---|---|---|
| | VDA SIDE | KAPTON SIDE |
| SOLAR ABSORPTANCE | 0.284 | 0.514 |
| EMITTANCE | 0.150 | 0.755 |
| TRANSMITTANCE | 0.125 | 0.124 |
| DC RESISTANCE | 20 Ω/SQUARE | |

FIGS. 3–6 show embodiments of blankets for protecting a spacecraft from a space environment which utilize a PIM shield in accordance with the present invention. A schematic, cross-sectional view of an embodiment of a PIM isolator blanket 30 is illustrated in FIG. 3. The PIM isolator blanket 30 includes a first outer layer 32 and a second outer layer 34. It is preferred that the first outer layer 32 and the second outer layer 34 be formed using a black polyimide film such as Class 1 carbon-filled Kapton. Class 1 carbon-filled Kapton has a surface resistivity between $10^4$ ohms per square and $10^8$ ohms per square.

One or more VDA layers 36 are disposed between the first outer layer 32 and the second outer layer 34. A PIM shield 38 is disposed between the first outer layer 32 and the one or more VDA layers 36. The PIM shield 38 is utilized to shield the PIM generated by the one or more VDA layers 36. A VDA side 39 of the PIM shield 38 is proximate to the first outer layer 32.

FIG. 4 shows a schematic, cross-sectional view of an embodiment of an RFI (radio frequency interference) shielding blanket 40. The RFI shielding blanket 40 includes a first outer layer 42 and a second outer layer 44. Preferably, the first outer layer 42 and the second outer layer 44 are formed using a black polyimide film such as Class 2 or Class 4 carbon-filled Kapton. Class 2 carbon-filled Kapton has a surface resistivity between 100 ohms per square and 300 ohms per square. Class 4 carbon-filled Kapton has a surface resistivity between 300 ohms per square and 430 ohms per square.

One or more VDA layers 46 are disposed between the first outer layer 42 and the second outer layer 44. A PIM shield 48 is disposed between the first outer layer 42 and the one or more VDA layers 46. The PIM shield 48 is utilized to shield the PIM generated by the one or more VDA layers 46. A VDA side 49 of the PIM shield 48 is proximate to the first outer layer 42.

Turning now to FIG. 5, there is shown a schematic, cross-sectional view of an embodiment of a PIM suppressive blanket 50. The PIM suppressive blanket can be used as a PIM shield for spacecraft structures and components. The PIM suppressive blanket 50 includes a PIM shield 52 disposed between a first outer layer 54 and a second outer layer 56. The PIM shield 52 acts as a main shielding component of the PIM suppressive blanket 50. The first outer layer 54 and the second outer layer 56 can be formed using Class 1 or Class 3 carbon-filled Kapton. Class 3 carbon-filled Kapton has a surface resistivity between 800 ohms per square and 1600 ohms per square.

FIG. 6 shows a schematic, cross-sectional view of an embodiment of a radio frequency reflection-suppression blanket 60 in accordance with the present invention. The RF reflection-suppression blanket 60 includes a first outer layer 62 and a second outer layer 64. Preferably, the first outer layer 62 is formed using Class 3 carbon-filled Kapton and the second outer layer is formed using Class 1 carbon-filled Kapton.

Disposed between the first outer layer 62 and the second outer layer 64 are a first spacer 66, a first interior layer 68, a second spacer 70, a PIM shield 72, one or more VDA layers 74 and a second interior layer 76. The PIM shield 72 is oriented to have its VDA side 78 is proximate to the second spacer 70. Preferably, the first interior layer 68 and the second interior layer 76 are formed using Class 4 carbon-filled Kapton having a resistivity of near 330 ohms per square.

It is noted that the PIM shields 38, 48, 52, and 72 can each include more than one PIM shield layer, and each layer can be either single-sided or double-sided VDA.

The above-described embodiments of the present invention have many advantages. The base materials of a vacuum deposited aluminum layer over a substrate of Kapton are flight proven and are amenable to use in a thermal blanket construction. The surface resistivity can be adjusted to fall within an ideal "balanced" range (between 10 ohms per square and 40 ohms per square) for inherent PIM suppression and PIM shielding. This range provides for excellent PIM shielding while avoiding a higher PIM potential caused by the shielding material.

The resulting PIM shield is light-weight, thin, durable, and economical. Further, the PIM shield can be cut and shaped to fit a structure for the purpose of PIM shielding. The PIM shield has improved thermal properties over standard carbon Kapton and tolerates high transmit flux densities without adverse effects. Applications of the PIM shield include low PIM thermal blankets for spacecraft.

While the best mode for carrying out the invention has been described in detail, those familiar with the art to which this invention relates will recognize various alternative designs and embodiments for practicing the invention as defined by the following claims.

What is claimed is:

1. A passive intermodulation shield comprising:

a substrate; and a conducting layer deposited over the substrate to produce a surface resistivity between 2 ohms per square and 200 ohms per square;

wherein the surface resistivity is greater than 2 ohms per square to limit an amount of inherent passive intermodulation generation, and wherein the surface resistivity is less than 200 ohms per square to limit an amount of passive intermodulation passthrough.

2. The passive intermodulation shield of claim 1 wherein the substrate includes a polyimide sheet.

3. The passive intermodulation shield of claim 1 wherein the substrate includes a Kapton sheet.

4. The passive intermodulation shield of claim 1 wherein the surface resistivity is between 4 ohms per square and 100 ohms per square.

5. The passive intermodulation shield of claim 1 wherein the surface resistivity is between 10 ohms per square and 40 ohms per square.

6. The passive intermodulation shield of claim 1 wherein the surface resistivity is selected to maintain both the inherent passive intermodulation generation and the passive intermodulation passthrough below a predetermined value.

7. The passive intermodulation shield of claim 6 wherein the surface resistivity is selected to maintain both the inherent passive intermodulation generation and the passive intermodulation passthrough below −20 dB.

8. The passive intermodulation shield of claim 6 wherein the surface resistivity is selected to maintain both the inherent passive intermodulation generation and the passive intermodulation passthrough below −35 dB.

9. The passive intermodulation shield of claim 6 wherein the surface resistivity is selected to maintain both the inherent passive intermodulation generation and the passive intermodulation passthrough below −55 dB.

10. The passive intermodulation shield of claim 1 wherein the surface resistivity is selected to be near-optimal in minimizing the maximum of the inherent passive intermodulation generation and the passive intermodulation passthrough.

11. The passive intermodulation shield of claim 1 wherein the surface resistivity is selected so that the inherent passive intermodulation generation is approximately equal to the passive intermodulation passthrough.

12. A passive intermodulation shield for a spacecraft, the passive intermodulation shield comprising:

a Kapton substrate; and a vacuum deposited aluminum layer over the substrate, the vacuum deposited aluminum layer having a thickness to produce a surface resistivity between 10 ohms per square and 40 ohms per square to maintain both an inherent passive intermodulation generation and a passive intermodulation passthrough to be below −55 dB.

13. A blanket for protecting a spacecraft from a space environment comprising:

a pair of outer layers; and a passive intermodulation shield disposed between the pair of outer layers, the passive intermodulation shield having a conducting layer deposited over a substrate to produce a surface resistivity between 2 ohms per square and 200 ohms per square;

wherein the surface resistivity is greater than 2 ohms per square to limit an amount of inherent passive intermodulation generation, and wherein the surface resistivity is less than 200 ohms per square to limit an amount of passive intermodulation passthrough.

14. The blanket of claim 13 wherein each of the pair of outer layers includes a respective plastic conductive sheet.

15. The blanket of claim 13 further comprising one or more vacuum deposited aluminum layers disposed between the passive intermodulation shield and a first of the pair of outer layers, wherein the passive intermodulation shield is operative to shield passive intermodulation generated by the one or more vacuum deposited aluminum layers.

16. The blanket of claim 13 wherein the surface resistivity is between 10 ohms per square and 40 ohms per square.

17. The blanket of claim 13 wherein the surface resistivity is selected to maintain both the inherent passive intermodulation generation and the passive intermodulation passthrough below a predetermined value.

18. The blanket of claim 13 wherein the surface resistivity is selected to maintain both the inherent passive intermodulation generation and the passive intermodulation passthrough below −55 dB.

19. The blanket of claim 13 wherein the surface resistivity is selected to be near-optimal in minimizing the maximum of the inherent passive intermodulation generation and the passive intermodulation passthrough.

20. The blanket of claim 13 wherein the surface resistivity is selected so that the inherent passive intermodulation generation is approximately equal to the passive intermodulation passthrough.

\* \* \* \* \*